United States Patent Office 3,153,685
Patented Oct. 20, 1964

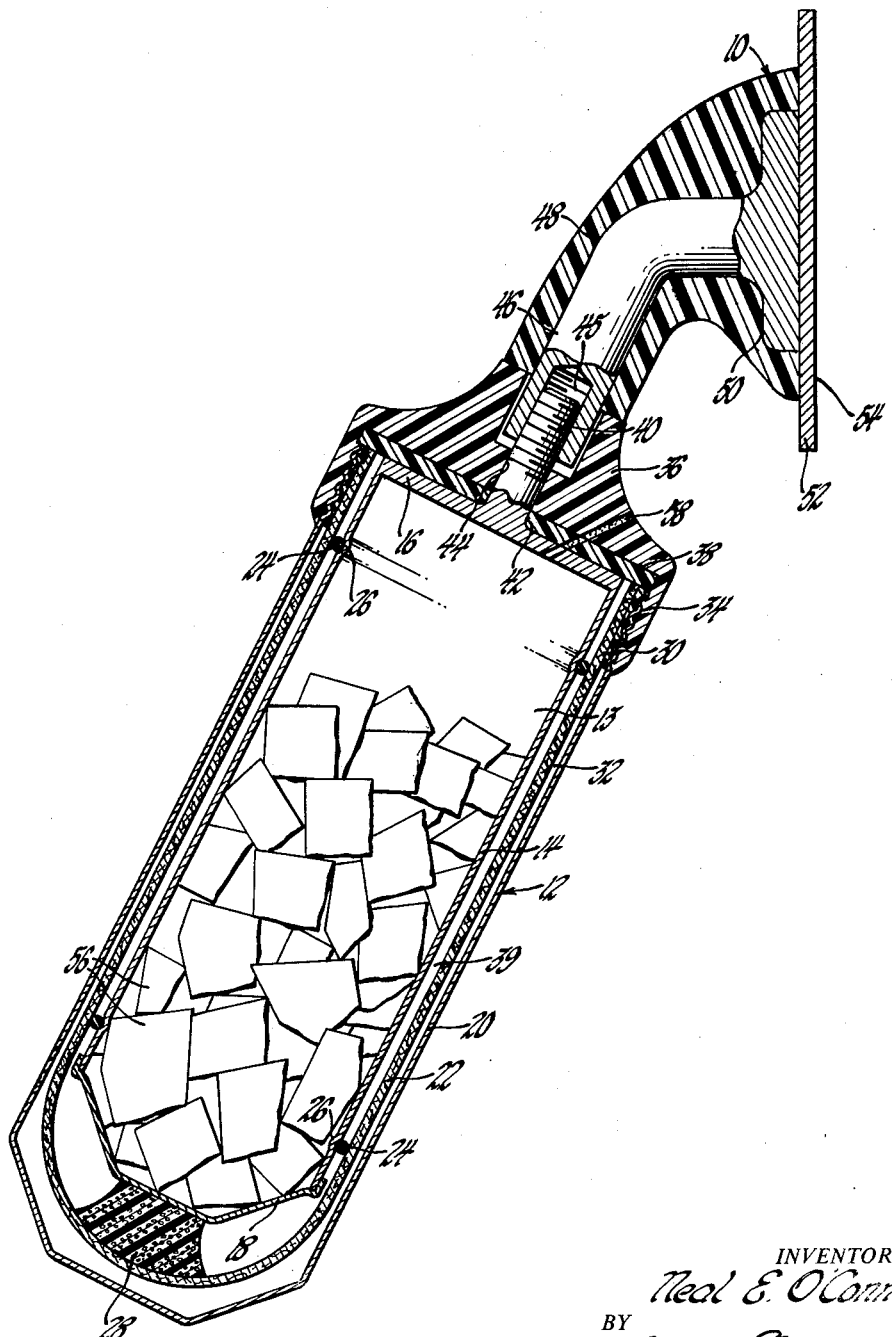
INVENTOR.
*Neal E. O'Connor*
BY
*G.S. Shampo*
ATTORNEY

3,153,685
APPLYING EPOXY RESIN
Neal E. O'Connor, Birmingham, Mich., assignor to General Motors Corporation, Detroit, Mich., a corporation of Delaware
Filed Sept. 29, 1960, Ser. No. 59,257
2 Claims. (Cl. 264—28)

This invention relates to a method and device for applying liquid plastics and particularly to a refrigerated trowel or paddle for distributing liquid epoxy resin in joints between steel panels of automobile bodies.

For many years the automotive industry has been using lead base alloys as solders to fill exposed joints of automobile bodies. Recently, however, epoxy resins have been developed which possess all the necessary mechanical properties to be useful as body filler materials. Not only do these resins adhere readily and strongly to sheet steel, but they are very hard when set and possess extremely low shrinkage rates, typically in the order of only 2%. Even a large epoxy resin solder area will satisfactorily withstand extreme temperature conditions, such as those ranging from minus 50° F. to plus 150° F. Epoxy resins also are useful in combination with glass fibers to repair holes or dents in steel panels, as described and claimed in United States Patent No. 2,795,523, Cobb et al. Of course, these resins likewise can be employed to repair cracks or other defects in panels formed of glass fiber-reinforced polyester resin and other plastics.

Epoxy resin heretofore has not been used as an automobile body filler material or body solder, however, primarily because of the difficulty that has been encountered in working or smoothing the resin after it has been applied to the work surface. This problem results from the well-known tendency for catalyzed liquid epoxy resin to adhere tenaciously to the applicator or any other solid surface with which it comes into contact. Hence it is virtually impossible to successfully use a conventional applicator at room temperature for any measurable period of time.

A principal object of the present invention, therefore, is to provide an inexpensive and easily manipulated applicator which is designed so that epoxy resin being applied to an automobile body or other object does not adhere to the applicator. This and other objects of the invention are attained with a refrigerated paddle or applicator having a working surface which is maintained at a temperature below 0° F. while the liquid epoxy resin is being applied to an automobile body panel or other article. The resin does not adhere to a paddle of this type, thus permitting the resin to be smoothly distributed with a minimum of effort. Therefore, the method of repairing automobile bodies in accordance with this invention can be mastered in a short time by semi-skilled personnel. Moreover, less epoxy resin is wasted, and the time required to apply the resin is substantially decreased.

Other objects and advantages of this invention will more fully appear from the following detailed description of a preferred embodiment, reference being made to the accompanying drawing showing a longitudinal sectional view of a refrigerated epoxy resin applicator or paddle.

As shown in the drawing, the applicator consists basically of a trowel portion 10, which provides the working surface of the applicator, and a hollow handle portion 12. This handle contains a Dry Ice reservoir 13 formed by a generally cylindrical container or canister 14 having a flat end wall 16 and an opposite open end on which is fitted a removable end cap 18. Surrounding the canister is an essentially air-tight or evacuated, double-walled housing consisting of a generally cylindrical outer casing 20 and a similarly shaped inner sleeve or liner 22 which is spatially separated from the casing. The liner, in turn, is spaced from the canister 14 by means of rings 24. These rings or spacers are maintained in position in inwardly extending annular grooves 26 in the cylindrical side walls of the canister. The ends of the liner 22 and the outer casing 20 adjacent the removable end cap 18 are spaced from each other, and the liner is thermally separated from the end cap by a retainer cushion 28 formed of a suitable insulating material such as foam rubber or foamed plastic. This cushion may be glued or otherwise secured to either the end cap or to the adjacent end of the liner.

The opposite end of the liner near the trowel portion 10 of the applicator is bonded to the adjacent portions of the side walls of the outer casing 20 by means of a thermosetting resin 30 or other suitable means to provide an essentially air-tight space 32 between these members. This end of the casing also is grooved or threaded as shown at 34 so that a thermally nonconductive screw cap 36 may be threadedly attached to the housing. Positioned between the screw cap and the flat end wall 16 of the canister 14 is a flat washer 38 formed of rubber or other suitable material having good thermal insulation properties. In this manner, the space 39 between the cylindrical side walls of the liner 22 and the side walls of the canister is sealed at the trowel end of the applicator, and the canister is thermally insulated from the other components of the handle assembly. The insulating washer 38 also helps to provide a tight connection between the surrounding parts of the handle.

An externally threaded stud 40 is shown in the drawing as formed integral with the flat end wall 16 of the canister. This stud projects outwardly from this wall through openings 42 and 44 in the insulating washer 30 and screw cap 36, respectively, to threadedly engage internal threads 45 in the end of a metal core 46 of the insulated trowel portion 10. A relatively thick layer 48 of suitable insulating material, such as foamed plastic, cork, foam rubber, etc., surrounds the metal core. The opposite end of this core is provided with radially extending flanges 50 to which is secured by brazing or other suitable means the workplate 52 of the trowel. The outer working surface 54 of this workplate should be polished to further reduce any tendency for the epoxy resin to adhere to it.

Thus it will be seen that the insulated trowel portion or assembly 10 may be detached from the hollotw handle portion 12 of the applicator, and the screw cap 36 may be unthreaded from the outer metal casing 20 to permit the removal of the canister 14. The end cap 18 of the canister then may be removed to permit the canister to be filled with Dry Ice 56. $CO_2$ gas, which is formed during use of the refrigerated applicator paddle described above, readily escapes to the atmosphere through the vent hole 58 provided through the flat end wall 16 of the canister 14, the insulating washer 38 and the screw cap 36.

It is important to select the materials in the refrigerated paddle carefully. I have found that copper is a very satisfactory metal of which to form the trowel workplate 52, the trowel core 46, and the canister 14 and integral stud 40. However, other high heat-conductivity metals may be used for the thermally conductive portions of the refrigerated applicator. Silver and silver alloys, of course, function very well for this purpose as do aluminum and steel to a lesser extent. The insulating sleeve or liner 22 may be formed from almost any material having the necessary mechanical properties, such as polyethylene or polystyrene plastics, fiberboard, etc. The outer casing 20 also can be formed of plastic or other materials as well as metal. Foam rubber, polyurethane foam or vinyl foam can be conveniently employed to form the retainer cushion 28, and similar insulating materials can be used for the screw cap 36 and layer 48.

The construction described above provides excellent thermal conductivity between the trowel workplate 52 and the Dry Ice 56 through the canister 14 and integral stud 40 and the paddle core 46. At the same time, these conductive members are thermally insulated from the atmosphere by the sealed spaces 32 and 39, the retainer cushion 28, washer 38, the screw cap 36 and the insulating layer 48 around the metal core 46 of the trowel assembly.

It will be appreciated, of course, that the trowel may be cooled by means other than with solidified carbon dioxide. For example, cold water or other fluid could be circulated through the applicator. As indicated above, however, in order to prevent adhesion of the liquid epoxy resin to the trowel workplate 52, I have found it desirable to retain the temperature of this plate below 0° F. Such a low temperature can be conveniently provided by the Dry Ice reservoir construction hereinbefore described. It appears that the extremely low temperature of the trowel workplate retards any chemical action of the plastic at the working surface of this plate and that moisture condensing on this surface lowers the coefficient of friction between the workplate and the epoxy resin.

A mixture of one or more epoxy resins and a suitable catalyst or hardener may be employed. Various monomeric, low molecular weight diepoxides may be used as the principal epoxy resin constituents. Among the epoxy resins which are appropriate are rigid, room-temperature hardening, thermosetting resins with 100% reactive components when formulated with their complementary hardeners. Examples of appropriate epoxy resins are those identified as resin No. BR–18774 and resin No. BR–18795 manufactured and sold by Bakelite Company, a division of Union Carbide and Carbon Corporation. These diepoxides are reaction products of bis-phenol A ($C_6H_4OHC(CH_3)_2C_6H_4OH$ or dimethyl dipara-bis-phenol methane) and epichlorohydrin, the resultant product being polyglycidyl ether of bis-phenol A.

Typical hardeners which may be successfully employed are aliphatic polyamines which are especially synthesized to give the aforementioned epoxides a wide range of curing speeds, viscosity and pot life. Among the suitable polyamines are ethylene diamine, diethylene triamine, triethylene tetramine, etc. These and various other hardeners also may be blended to obtain specific properties in the finished product. Examples of such hardener blends are those identified as BR–18793 and BR–18807 manufactured and sold by Bakelite Company.

A particularly effective mixture of the aforementioned resins is a mixture of three parts by volume of Bakelite resin No. BR–18795 and two parts by volume of Bakelite resin No. BR–18774. Satisfactory results have been obtained when one part of catalyst is added to four parts by volume of resin or resin mixture.

The above-described refrigerated applicator can be advantageously used to distribute the catalyzed resin (hereinbefore referred to only by the term "resin") as a body solder in exposed joints of automobile body panels and on automobile fenders, doors, hoods, trunk lids, etc. For purposes of simplification, however, the term "automobile body," as used herein, is intended to encompass all of the aforementioned types of automobile or truck sheet metal panels whether or not these particular panels are normally designated as portions of an automobile body.

It is to be understood that while the invention has been described with specific reference to a particular embodiment thereof, it is not to be limited since variations thereof may be made within the scope of the invention as defined in the appended claims.

I claim:

1. A method of soldering comprising mixing epoxy resin and a catalyst for said resin to form a plastic solder, thereafter applying said mixture at or above room temperature to the article to be soldered, contacting said mixture on said article with a trowel portion of an applicator which is maintained at a temperature below 0° F., and spreading said resin with said trowel portion.

2. A method of soldering an exposed joint between automobile body panels, said method comprising mixing epoxy resin with a suitable catalyst to form a plastic solder, thereafter applying the catalyzed resin at or above room temperature to a joint formed by adjacent steel panels, subsequently smoothing said catalyzed resin in said joint at or above room temperature with a smooth-surfaced trowel portion of an applicator, said trowel portion being maintained at a temperature below 0° F., and permitting said catalyzed resin to solidify.

References Cited in the file of this patent

UNITED STATES PATENTS

| | | |
|---|---|---|
| 1,142,022 | Chappell | June 8, 1915 |
| 2,337,792 | Yokell | Dec. 28, 1943 |
| 2,385,149 | Martines | Sept. 18, 1945 |
| 2,458,032 | Simon | Jan. 4, 1949 |
| 2,536,001 | Chase | Dec. 26, 1950 |
| 2,746,264 | Keyes | May 22, 1956 |
| 2,795,523 | Cobb | June 11, 1957 |
| 2,874,407 | Chabot et al. | Feb. 24, 1959 |
| 2,951,004 | Martin et al. | Aug. 30, 1960 |
| 2,955,952 | Herbst | Oct. 11, 1960 |

OTHER REFERENCES

"Epoxy Resins" (Skeist et al.), published by Reinhold, New York.